(12) United States Patent
Kang et al.

(10) Patent No.: US 11,402,109 B2
(45) Date of Patent: Aug. 2, 2022

(54) AIR PURIFIER

(71) Applicants: LG ELECTRONICS INC., Seoul (KR); CHUNGANG UNIVERSITY INDUSTRY ACADEMIC COOPERATION FOUNDATION, Seoul (KR)

(72) Inventors: Jiyoung Kang, Seoul (KR); Haeyoong Chung, Seoul (KR); Jongkeon Jeon, Seoul (KR); David Kangseong Lee, Seoul (KR); Daeyoung Kwak, Seoul (KR); Sohee Park, Seoul (KR)

(73) Assignees: LG ELECTRONICS INC., Seoul (KR); CHUNGANG UNIVERSITY INDUSTRY ACADEMIC COOPERATION FOUNDATION, Seoul (KR)

( * ) Notice: Subject to any disclaimer, the term of this patent is extended or adjusted under 35 U.S.C. 154(b) by 265 days.

(21) Appl. No.: 16/815,573

(22) Filed: Mar. 11, 2020

(65) Prior Publication Data

US 2020/0300485 A1 Sep. 24, 2020

(30) Foreign Application Priority Data

Mar. 19, 2019 (KR) ........................ 10-2019-0031439

(51) Int. Cl.
 *F24F 3/16* (2021.01)
 *F24F 13/28* (2006.01)
 (Continued)

(52) U.S. Cl.
 CPC ............ *F24F 8/10* (2021.01); *B01D 46/0005* (2013.01); *B01D 46/0043* (2013.01);
 (Continued)

(58) Field of Classification Search
 CPC .......... F24F 8/10; F24F 13/28; F24F 2110/50; F24F 1/00; F24F 3/16; F24F 11/89;
 (Continued)

(56) References Cited

U.S. PATENT DOCUMENTS 10,508,658 B2   12/2019  Park et al.
2004/0118289 A1  6/2004  Chang et al.
(Continued)

FOREIGN PATENT DOCUMENTS

CN   1510349   7/2004
CN   1727774   2/2006
(Continued)

OTHER PUBLICATIONS

Chinese Office Action issued in Application No. 2021052802933960 dated Jun. 2, 2021.

(Continued)

*Primary Examiner* — Robert A Hopkins
*Assistant Examiner* — Qianping He
(74) *Attorney, Agent, or Firm* — KED & Associates, LLP

(57) ABSTRACT

An air purifier may include a main body and a floating body configured to levitate above the main body via magnetic force. The main body may include a fan to suction air, a filter to filter suctioned air, and a discharge port provided on an upper surface through which air is discharged. The floating body may be provided above the discharge port and further disperse discharged air. The main body may have a magnetic force generator to provide a magnetic force that levitates the floating body, and may also have a magnetic force adjustor configured to maintain a stable position of the floating body.

20 Claims, 10 Drawing Sheets

(51) Int. Cl.
  *B01D 46/24* (2006.01)
  *B01D 46/00* (2022.01)
  *B01D 46/42* (2006.01)
  *B01D 46/44* (2006.01)
  *F24F 8/10* (2021.01)
  *F24F 110/50* (2018.01)

(52) U.S. Cl.
  CPC ..... *B01D 46/0049* (2013.01); *B01D 46/0086* (2013.01); *B01D 46/2403* (2013.01); *B01D 46/4227* (2013.01); *B01D 46/4245* (2013.01); *B01D 46/44* (2013.01); *F24F 13/28* (2013.01); *F24F 2110/50* (2018.01)

(58) Field of Classification Search
  CPC ...... F24F 3/1603; F24F 3/28; B01D 46/0005; B01D 46/0043; B01D 46/0049; B01D 46/0086; B01D 46/2403; B01D 46/4227; B01D 46/4245; B01D 46/44; B01D 46/24; B01D 46/00; B01D 46/42
  USPC .......................................................... 96/408
  See application file for complete search history.

(56) References Cited

U.S. PATENT DOCUMENTS

| | | | |
|---|---|---|---|
| 2005/0268583 A1 | 12/2005 | Han et al. | |
| 2017/0246581 A1 | 8/2017 | Jung et al. | |
| 2017/0360980 A1* | 12/2017 | Jakins | A61L 9/04 |
| 2018/0264157 A1* | 9/2018 | Benedek | B01D 46/429 |
| 2019/0331137 A1* | 10/2019 | Xiao | F04D 29/325 |

FOREIGN PATENT DOCUMENTS

| | | | | |
|---|---|---|---|---|
| CN | 201662192 | | 12/2010 | |
| CN | 102221241 | | 10/2011 | |
| CN | 204519811 | | 8/2015 | |
| CN | 204687868 | | 10/2015 | |
| CN | 105333528 | | 2/2016 | |
| CN | 105571104 | | 5/2016 | |
| CN | 105571104 A | * | 5/2016 | ............. F24F 13/08 |
| CN | 205619461 | | 10/2016 | |
| CN | 106290967 A | | 1/2017 | |
| CN | 106 422 551 | | 2/2017 | |
| CN | 106765653 | | 5/2017 | |
| CN | 106765653 A | * | 5/2017 | |
| CN | 106871249 A | | 6/2017 | |
| CN | 106940078 | | 7/2017 | |
| CN | 206377768 | | 8/2017 | |
| CN | 206929937 | | 1/2018 | |
| CN | 107763750 | | 3/2018 | |
| CN | 107763754 | | 3/2018 | |
| CN | 107975878 | | 5/2018 | |
| CN | 207395002 | | 5/2018 | |
| CN | 108111060 A | | 6/2018 | |
| CN | 108626867 | | 10/2018 | |
| CN | 108800333 | | 11/2018 | |
| CN | 208222678 | | 12/2018 | |
| CN | 208296183 | | 12/2018 | |
| CN | 208296183 U | * | 12/2018 | |
| CN | 109340945 | | 2/2019 | |
| EP | 1 437 169 | | 7/2004 | |
| EP | 3 211 345 | | 8/2017 | |
| JP | S53-159152 | | 12/1978 | |
| JP | H09-178259 | | 7/1997 | |
| JP | 2005-288327 | | 10/2005 | |
| JP | 2011-106788 | | 6/2011 | |
| KR | 10-2006-0112758 | | 11/2006 | |
| KR | 10-0933634 | | 12/2009 | |
| KR | 10-2017-0044542 | | 4/2017 | |
| KR | 10-2017-0044543 | | 4/2017 | |
| KR | 10-2026194 | | 11/2019 | |
| WO | WO 2013/176213 | | 11/2013 | |
| WO | WO 2017/074128 | | 5/2017 | |
| WO | WO 2018/110730 | | 6/2018 | |

OTHER PUBLICATIONS

U.S. Appl. No. 16/815,506, filed Mar. 11, 2020.
U.S. Appl. No. 16/815,573, filed Mar. 11, 2020.
U.S. Appl. No. 16/815,663, filed Mar. 11, 2020.
Chinese Office Action dated Apr. 6, 2021 issued in Application No. 202010175621.9.
European Search Report dated Aug. 12, 2020 issued in EP Application No. 20163817.8.
European Search Report dated Aug. 12, 2020 issued in EP Application No. 20163887.1.
European Search Report dated Aug. 20, 2020 issued in Application No. 20164336.8.
Chinese Office Action dated Jun. 3, 2021 issued in Application No. 202010185182.X.
Chinese Office Action dated Jan. 6, 2022 issued in Application 202010175621.9.
European Office Action dated Mar. 1, 2022 issued in EP Application No. 20164336.8.

* cited by examiner

AIR PURIFIER

CROSS-REFERENCE TO RELATED APPLICATION(S)

This application claims priority under 35 U.S.C. § 119 to Korean Patent Application No. 10-2019-0031439, filed on Mar. 19, 2019, whose entire disclosures are hereby incorporated by reference.

FIELD

The present disclosure relates to an air purifier.

BACKGROUND

An air cleaner or purifier may be a device that suctions contaminated air, purifiers or filters the contaminated air, and then discharges the purified air. The air purifier may include a blower or fan to suction outside or ambient air into an interior of the air purifier and to discharge purified air to an outside of the air purifier. The air purifier may also include a filter capable of filtering dust, bacteria, and other foreign matter (hereinafter "foreign matter"). Generally, an air purifier may be configured to purify an interior space or room such as a home or office.

There has been a recent need for quick-working, large-capacity air purifiers due to increased pollution, yellow dust, etc. Applicant has previously filed an application for an air purifier, Korean Application No. 10-2016-0077888 (related to U.S. Pat. No. 10,508,658) to address this need. A multi-stage air purifier may be provided with a fan and an air flow controller or booster to quickly blow clean air into a desired space. The air flow controller may tilt and rotate to change a direction of discharged air from the fan.

The above references are incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein.

DETAILED DESCRIPTION

Figure 1:
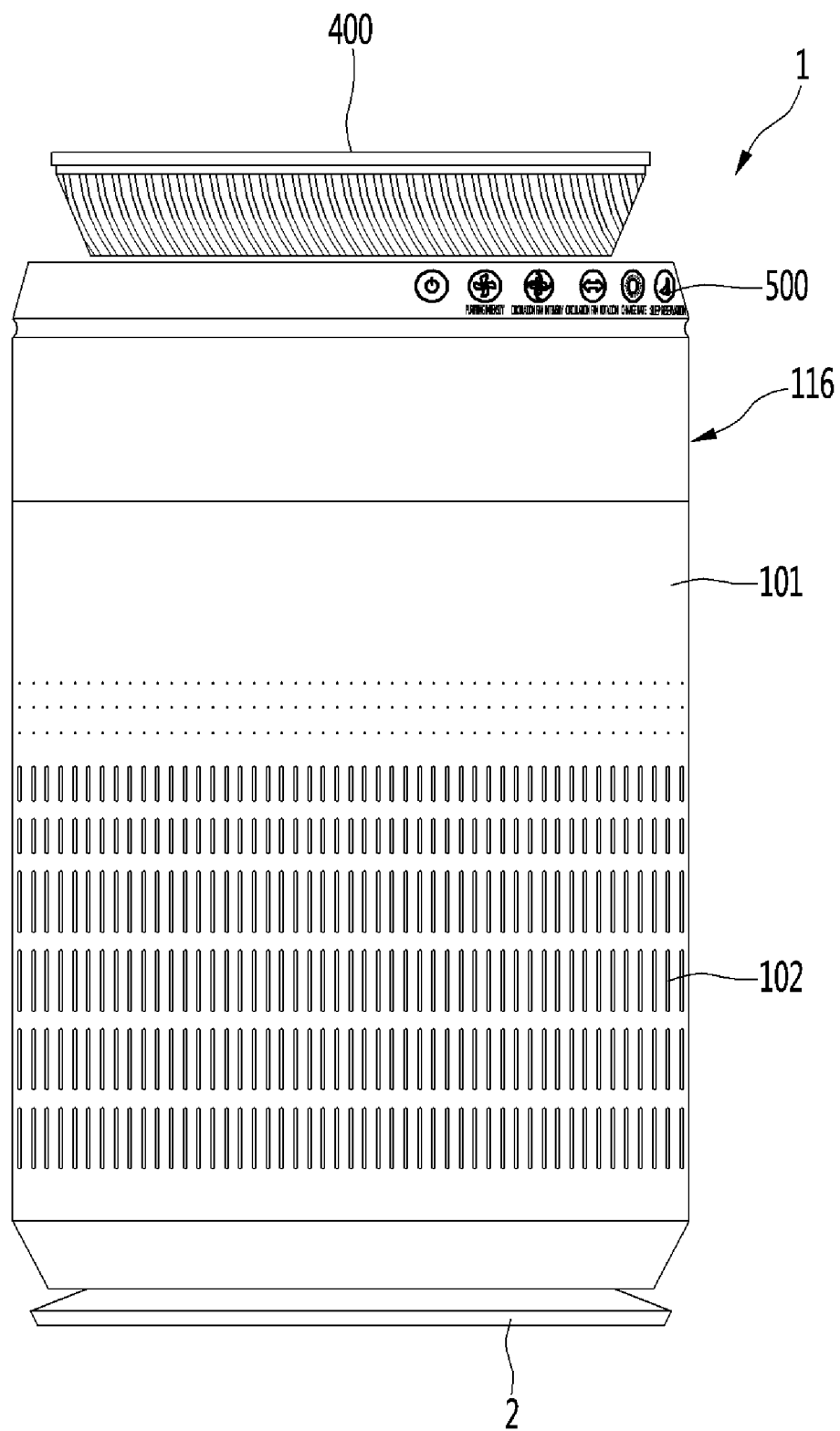
FIG. 1 is a front view of an air purifier according to an embodiment.

Referring to FIG. 1, an air purifier 1 may include a main body 116 that extends in a vertical direction and has a cylindrical shape. A floating body or a float 400 may be provided at an upper end of the main body 116. The floating body 400 may configured to be levitated upward via magnetic force to be spaced apart from the main body 116, and the floating body 400 may alternatively be referred to as a levitating body.

The main body 116 may suction air from at least one of a side surface or a bottom surface and discharge air from an upper or top surface. Air discharged from the main body 116 may flow through the floating body 400 at a high flow rate, and a flow direction of the discharged air may be changed.

The main body 116 may include a cylindrical outer wall or shell 101 forming a space therein and a base 2 placed at a lower end of the outer wall 101. A suction portion or space 102 may be formed below the outer wall 101 between the base 2 and the outer wall 101 to allow outside or ambient air to be suctioned into the air purifier 1. A main body display 500 may be provided at an upper end of the main body 500 to display an operation state, an outside air state or quality of the main body 116, time, or other information.

The floating body 400 may be levitated upward to be floating above the main body 116. The floating body 400 may be provided with a fan therein. By forced blowing or discharging by the fan and a manual rotation of the fan by the discharged air, the floating body 400 may perform the role of concentrating the discharged air or changing directions of the air flow, acting as an air flow controller or booster. The floating body 400 may also be referred to as a floating booster or air flow controller 400.

The floating body 400 may be levitated by a magnetic or electromagnetic force, and may not require a separate rotating mechanism and/or a separate tilting mechanism. When the floating body 400 is levitated above the main body 116, a space between the floating body 400 and the main body 116 may be unobstructed, and the floating body 400 may not require another structure (e.g., a wall or pipe) to support the floating body 400 above the main body 116, reducing obstructions and interferences with air discharged from the main body 116.

A floating distance of the floating body 400 above the main body 116 may be adjusted. As the floating body 400 is levitated higher, a flow of air discharged from the main body 116 may be smoother.

The floating body 400 may be lightweight and have a sparse skeleton or support. A side surface of the floating body 400 may resemble a grill and may have blades or extensions with spaces between the blades. A lower or bottom surface of the floating body 400 may also have openings or be substantially open. Air discharged from the main body 116 may be discharged through the floating body 400 even when the floating body 400 is not lifted and is instead seated on the main body 116.

The body 400 may receive power transmission from the main body 116 by a wireless power transfer (WPT) method (e.g., electromagnetic power transfer). The floating body 400 may float by mutual magnetic action with the main body 116. The fan inside of the floating body 400 may rotate the floating body 400 and also blow air.

Figure 2:
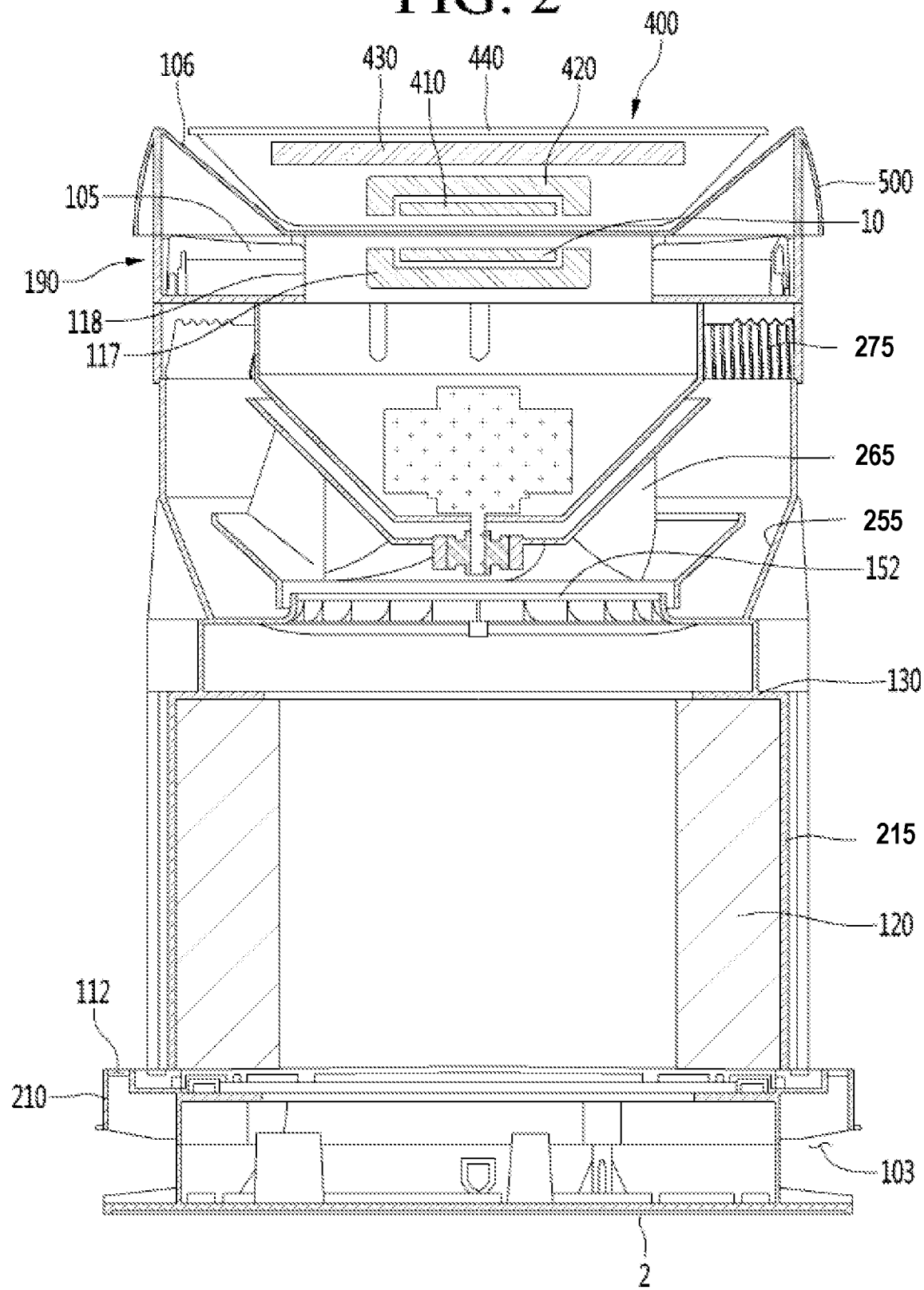
FIG. 2 is a sectional view showing an internal structure of the air purifier of FIG. 1.

FIG. 2 may be understood as a state in which a configuration of the outer wall 101 is removed. in FIG. 2, the vertical direction may be called an axial direction and the horizontal direction may called a radial direction. The vertical direction may be the same as a gravity direction.

Referring to FIG. 2, the air purifier 1 may have a fan 260 to generate an air flow. Air may be suctioned by the fan 260 into an interior of the main body 116 through a bottom. The axial direction may correspond to a central axis direction or a motor axial direction of the fan 260. The radial direction may be perpendicular to the axial direction. The circumferential direction may a circular direction formed by a rotation about the axial direction at a fixed radial distance.

The base 2 provided below the outer wall 101 may be placed on a floor or ground surface. The base 2 may be spaced apart from a lower end of the outer wall 101. A base side suction portion 103 may be formed in the space between the outer wall 101 and the base 2. A suction grill 215 having a suction port 112 may be provided on an upper side of the base 2. Air suctioned through the base side suction portion 103 may flow upward through the suction port 112 of the suction grill 215.

A filter 120 may be provided above the suction grill 215 to filter foreign matter from the suctioned air. The air suctioned through the suction port 112 and the base side suction portion 103 may pass through the filter 120. The filter 120 may have a cylindrical shape or cylindrical shell shape so that air may flow into an interior of the filter 112 through an outer circumferential direction from all radial directions. An outer surface of the filter 120 may be a filtering surface. The filter 120 may have an optional bottom surface so that air flowing in the axial direction or partially in the axial direction may be suctioned through the bottom surface of the filter 120. Accordingly, an area of the filtering surface may be increased, and air may be filtered from any direction. The filter 120 may be any one of a HEPA filter, a carbon filter, a pleated filter, a mesh filter, a strainer, or any combination of these filters.

The air purifier 1 may further include a filter frame 130 forming a space in which the filter 120 may be mounted. The filter frame 130 may support an entire load of each component that performs a function of the air purifier 1 inside the outer wall 101.

The mounting space may be formed in a cylindrical shape corresponding to the shape of the filter 120. The filter 120 may be slidably received in the mounting space during a mounting process, and slidably drawn out from the mounting space in a separating or removal process.

A blowing device or fan assembly may be provided inside the outer wall 101 to provide air flow. The blowing device may include the fan 265 and a fan housing 255 installed at an outlet side of (i.e., above) the filter 120. The fan 265 may be housed in the fan housing 255. The fan housing 255 may be supported by the filter frame 130.

The fan 265 may provide a flow pressure of air through rotation. The fan 265 may be placed above a fan inlet 152. The fan 265 may be a centrifugal fan to introduce air in the axial direction and discharge air upward and in the radial direction, but embodiments disclosed herein are not limited hereto.

The blowing device may further include an air guide device 275 coupled to the fan 265 to guide a flow of air passing through the fan 265. The air guide device 275may be positioned above the fan housing 255. The air guide device 275may have an outer diameter that is similar to an outer diameter of the fan housing 255 and may be stacked on the fan housing 255 to guide a flow of the air passing through the fan 265.

A discharge guide device 190 may be provided on an upper end of the air purifier 1 to form an outer and upper end exterior. The discharge guide device 190 may include a discharge port or grill 105, which may be formed as a discharge grill at an upper portion of the air purifier 1.

The discharge guide device 190 may further include a seating grill 106 in which the floating body 400 may be seated. At least a part of the seating grill 106 may have a shape corresponding to a lower shape or contour of the floating body 400. The seating grill 106 may be configured to receive the floating body 400 so that the floating body 400 may be stably positioned when seated. As shown in FIG. 2, the seating grill 106 may be inclined outward in an upward direction, and sides of the floating body 400 may also be inclined outward in the upward direction to correspond to sides of the seating grill 106. An inclination of the sides of the seating grill 106 may be configured to keep the floating body 400 centered when levitated and when seated.

The seating grill 106 may have a grid or lattice shape in which a plurality of ribs or extensions intersect. The seating grill 106 may minimize a flow resistance of the clean air discharged from the fan 265. The seating grill 106 may be provided above the discharge grill 105.

A body module 118 may be provided below an approximate center portion of the seating grill 106. The body module 118 may interact with the floating body 400. The body module 118 may be provided with a lower body 10 and a main body WPT module 117, which may support or levitate the floating body 400 from below. The floating body 400 may also be operated and/or adjusted via the lower body 10, which will be described later with reference to FIG. 6. The body module 118 may be fixed to the discharge guide device 190 including the discharge grill 105. The body module 118 may be somewhat heavy due to internal components or devices to operate the floating body 400.

The discharge grill 105 may be provided as a pair spaced vertically apart and facing each other, and the body module 118 may be supported by the pair of discharge grills 105. Alternatively or in addition thereto, the body module 118 may be supported on a lower surface of the seating grill 106, which may different from the discharge grill 105. The body module 118 may be positioned below the floating body 400 to allow the floating body 400 to levitate and float by the lower body 10.

The seating grill 106 and the discharge grill 105 may be described as being provided as one discharge guide device 190. However, the seating grill 106 and the discharge grill 105 may be formed separately and later fixed or coupled to each other and also to the air guide device 275 and the fan housing 255.

The main body display 500 may be provided at an upper end of the outer wall 101. As exemplified in FIGS. 2 and 3, the main body display 500 may be provided on an inclined upper side surface of the outer wall 101, but embodiments disclosed are not limited to such a position. The main body display 500 may display an operating state, a current air quality, time, power information, or other information. The main body display 500 may include a user interface (e.g., a touch panel) so that the user may use the touch panel as a controller of the air purifier 1.

The floating body 400 may include an optional floating body display 440 to display information about the floating body 400. The main body display 500 may also display information about the floating body 400, especially if the floating body display 440 is omitted. For convenience of description, the floating body 400 will be described as having the floating body display 440. However, an advantage of omitting the floating body display 440 is that air passing through the floating body 400 may be less obstructed.

The floating body 400 may have a magnetic body 410 to generate a magnetic force corresponding to an electromagnetic force provided from the body module 118. The floating body 400 may also include a floating body WPT module 420 (e.g., wireless power transceiver or receiver) to interact with the main body WPT module 117 (e.g., wireless power transceiver or transmitter). The floating body 400 may further include an operation portion 430. A detailed interaction between the floating body 400 and the body module 118 and/or the lower module 10 will be described later with reference to FIGS. 6-7

Figure 3:
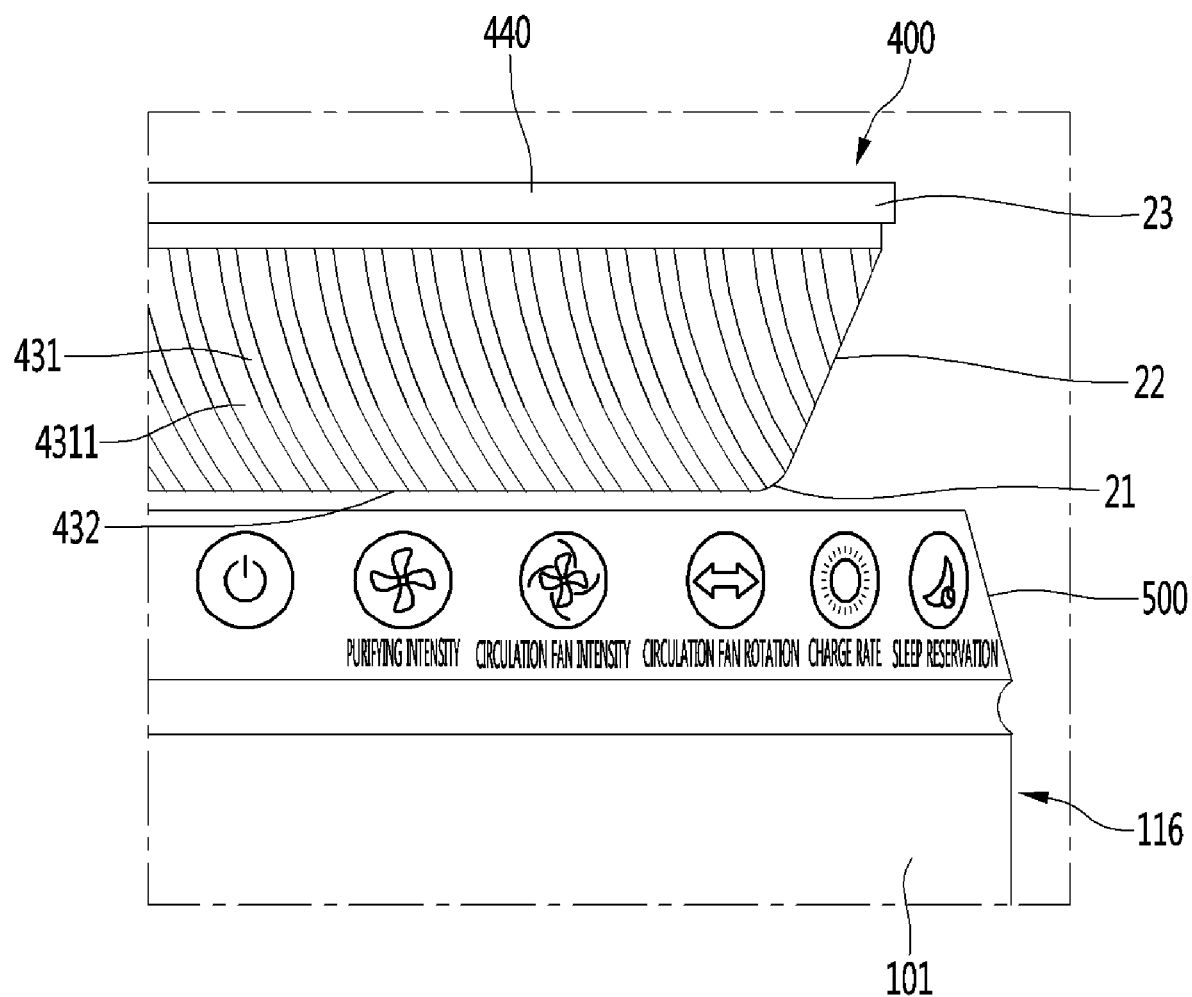
FIG. 3 is an enlarged view of an upper portion of the air purifier of FIG. 1.

Referring to FIG. 3, the main body display 500 may be inclined and show a control state of both the main body 116 and the floating body 400. The user may control operations of both the main body 116 and the floating body 400 via the main body display 500.

The seating grill 106 may be downwardly recessed from an upper surface of the main body 116, and the floating body 400 may be placed inside the seating grill 106. An inner inclined surface of the seating grill 106 may be provided inside an outer inclined surface of the main body display 500.

The floating body 400 may have a lower portion or section 21, a middle portion or section 22, and an upper portion or section 33. The floating body display 440 may be placed on a rim of the upper portion 23 to display a status, and may optionally include a user interface such as a touch panel.

A body of the middle portion 22 may be formed as a rotary grill 431, and may have a trapezoidal shaped or truncated cone-shaped cross-section such that a radius of the middle portion 22 is increased in an upward direction. A bottom portion or surface 432 may be provided at a lower end of the floating body 400.

The rotary grill 431 may be provided with a plurality of ribs or blades 4311 that are curved or bent in one direction and extending vertically. Openings or slits may be formed between the ribs 4311. Discharged air may be blown to the rotating grill 431, and the floating body 400 may be rotated by air pushing past the ribs 4311. The clean air that may have passed through the floating body 400 may have a reduced flow rate, and may be supplied to a periphery of the air purifier.

The ribs 4311 may alternatively have a straight shape instead of an inclined, bent, or braid shape. In this case, the floating body 400 may not rotate or be less likely to rotate even if clean air is discharged from the main body 116. However, clean air may spread to a wider area, as a flow rate of air may be faster and not reduced by the rotating ribs 4311.

Figure 4:
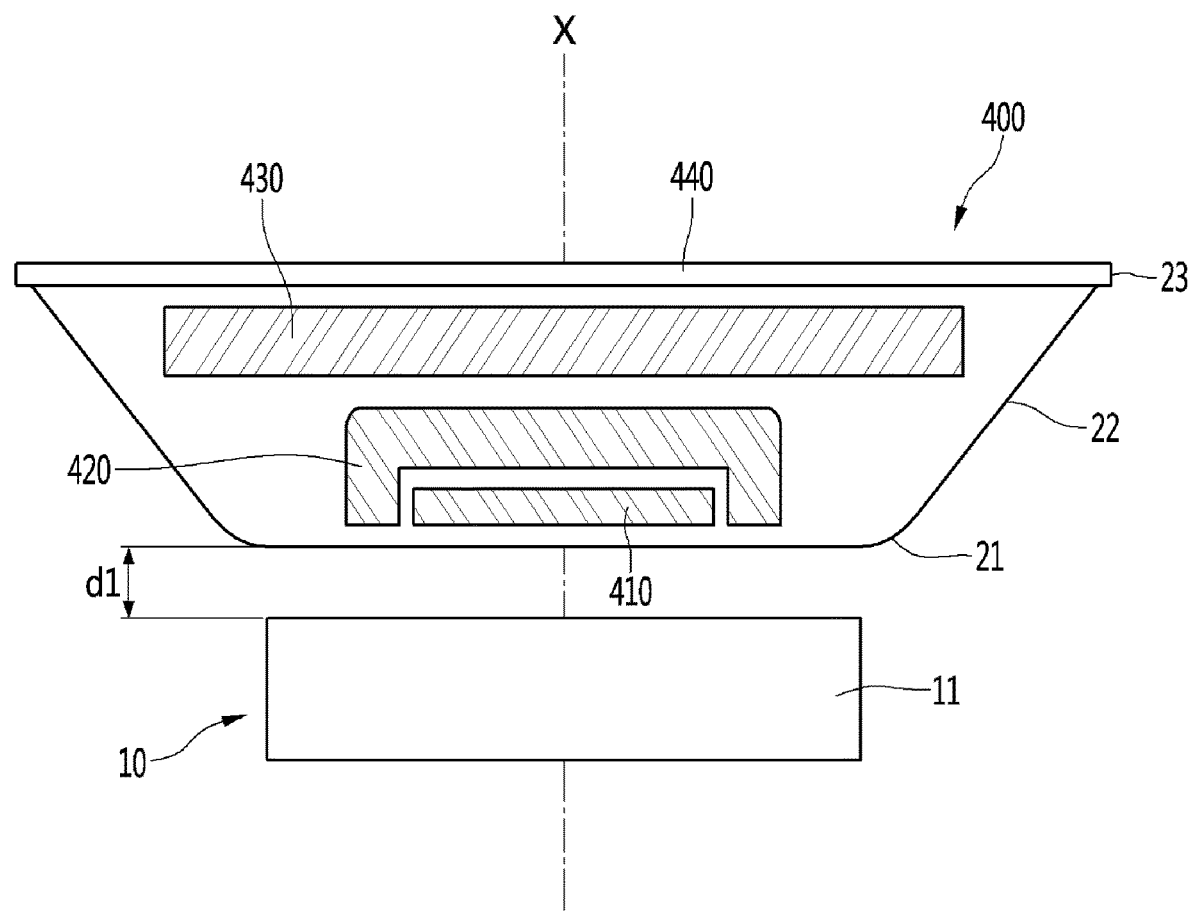
FIG. 4 is a schematic view showing a float or floating body separated from a lower body by a relatively small amount d1.
Figure 5:
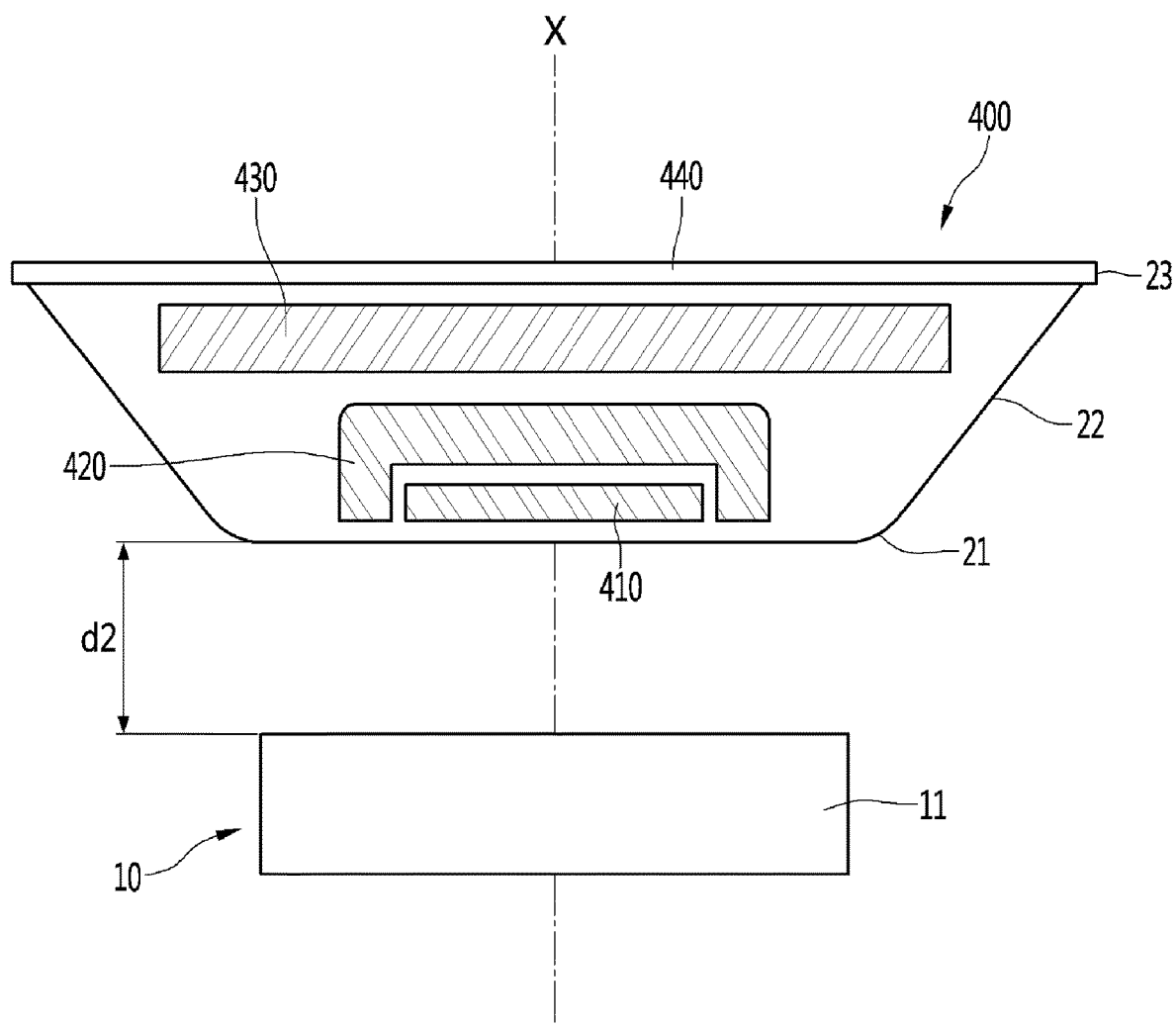
FIG. 5 is a schematic view showing the float separated from a lower body by a relatively high amount d2.

Referring to FIGS. 4 to 5, the floating body 400 may generate a magnetic force or polarity that is repelled by a magnetic force or polarity provided from the lower body 10. Together, the floating body 400 and the lower body 10 may magnetically repel each other. The magnetic body 410 may be provided inside the lower portion 21 of the floating body 400 to generate a magnetic force.

Alternatively, the floating body 400 may be made of a ferromagnetic or diamagnetic material, and the lower body 10 may generate an electromagnetic force that repels that floating body 400.

Figure 6:
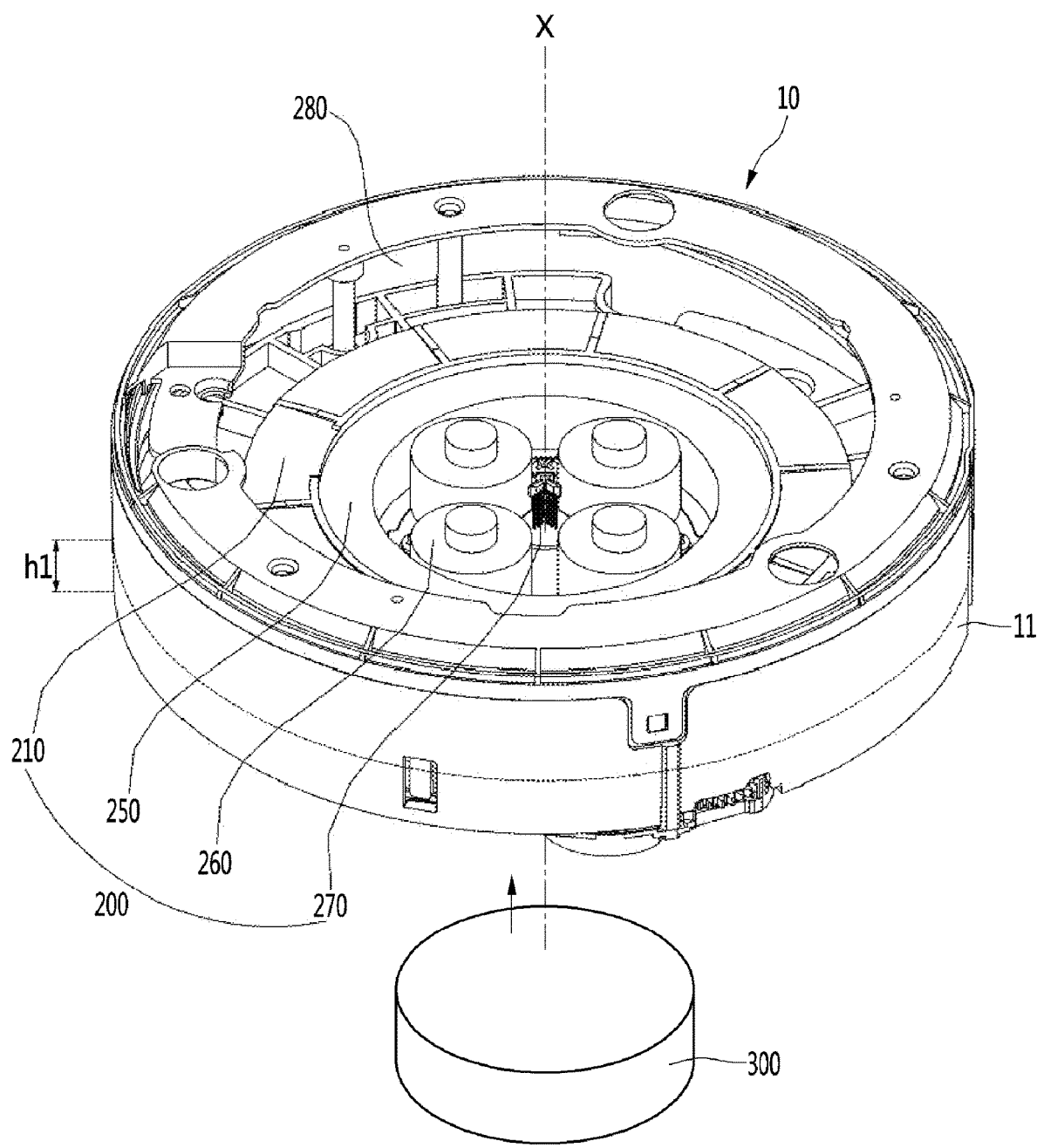
FIG. 6 shows an elevating member of the lower body positioned at a relatively low height h1.
Figure 7:
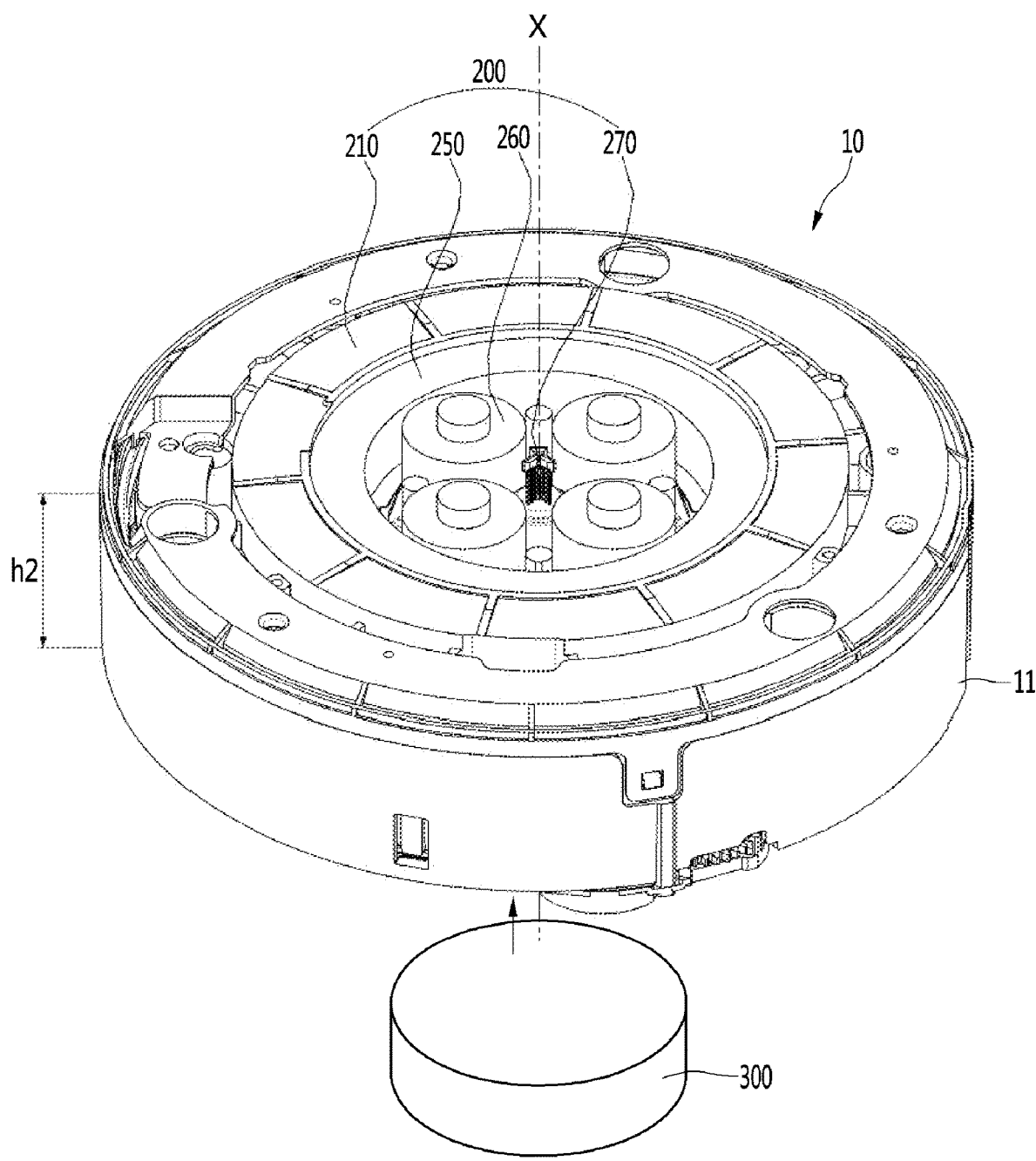
FIG. 7 shows the elevating member positioned at a relatively high height h2.

The lower body 10 may be provided below the floating body 400 in the body module 118 of the main body 116. The lower body 10 may include a case 11 forming an outer appearance. The case 11 may have a cylindrical shell shape and have a circular cross section when viewed from above. The case 11 may have an internal space therein. A lifting or elevating device 280 and a lifting mechanism 300 to raise and lower the lifting device 280 may be provided in the case 11 (FIG. 6-7). The lower body 10 may be supported by the discharge grill 105 through the body module 118. Alternatively, the lower body 10 may be fixed to any device that is also connected or fixed to the fan housing 250.

Referring to FIGS. 4-7, the lower body 10 may include the lifting device 280, which may be configured to move in the vertical direction. The lower body 10 may include the lifting mechanism 300 to raise and lower the lifting device 280 in the vertical direction.

The lifting device 280 may include a magnetic force or field generator 250 that generates a magnetic field for floating the floating body 400 in the air. A magnetic force generator or generating device 250 may generate a magnetic force in relation to the magnetic body 410 of the floating body 400. The magnetic force generator 250 may be provided as an electromagnet, such as a ring-shaped permanent magnet. One of the upper or lower surfaces of the magnetic force generator 250 may have a north (N) pole and the other may have a south (S) pole. For convenience of description, an embodiment where the upper surface of the magnetic force generator 250 has a N pole and the lower surface has an S pole will be described.

Some of the magnetic force lines generated by the magnetic force generator 250 may be bent in a direction upward and away from a centrifugal center starting from the N pole (the upper side of the magnetic force generator 250), toward the floating body 400 and the lower body 10, and returning to the S pole (lower side of the magnetic force generator 250).

Other magnetic force lines generated by the magnetic force generator 250 may be bent in the centrifugal direction starting from the N pole (the upper side of the magnetic force generator 250) and returning to the S pole (lower side of the magnetic force generator 250). In this case, the upper side may have the S pole on a central axis X and the lower side may have the N pole.

The floating body 400 may be configured such that the lower side of the magnetic body 410 may have an S pole and the upper side may have a N pole in order to levitate on the central axis X. The lower surface of the magnetic body 410 of the floating body 400 and the upper surface of the magnetic force generator 250 of the lower body 10 may be configured to have opposite polarities.

The magnetic force may be a repulsive force that becomes stronger as the floating body 400 is positioned closer to the magnetic force generator 250 on the central axis X. A floating height of the floating body 400 may be maintained at a position where gravity acting in the downward direction and the magnetic force acting in the upward direction of the floating body 400 are in equilibrium. Such a state in which the floating body 400 is levitated when the gravitational force and magnetic force are balanced (i.e., equal and opposite) may be defined as an equilibrium state.

A relative position of the floating body 400 and the magnetic force generator 250 may remain constant in the equilibrium state. In the equilibrium state, the floating body 400 may be centered on the central axis X or have a predetermined position with respect to the central axis X. If the height of the magnetic force generator 250 is changed vertically, a levitation height of the floating body 400 may also be changed by a same amount. The magnetic force generator 250 may be moved up and down via the lifting device 280 and the lifting mechanism 300.

When the magnetic force generator 250 is moved downward, the floating body 400 may move downward to be seated on the seating grill 106. Once seated, an operation of the magnetic force generator 250 may be stopped.

The lifting device 280 may include a frame 210 to which the magnetic force generator 250 may be fixed. The frame 210 may support the magnetic force generator 250 and have a circular shape when viewed from above. The magnetic force generator 250 may be provided above a central portion of the frame 210.

The lifting device 280 may include a Hall sensor 270 provided on the central axis X. The hall sensor 270 may sense a magnetic flux, field, or force. The magnetic flux sensed by the Hall sensor 270 may be compared to a predetermined initial magnetic flux value, which may represent a value of the magnetic flux when only the magnetic force generator 250 is operated (i.e., without the magnetic body 410). Alternatively, the initial magnetic flux value may represent a magnetic flux sensed in the equilibrium state.

When the floating body 400 is displaced from the central axis X to become misaligned, the Hall sensor 270 may sense a magnetic flux that is greater than the predetermined initial magnetic flux value. The lifting device 280 may include a magnetic force or field adjuster or adjusting device 260 to prevent the floating body 400 from deviating from the central axis X. The magnetic force adjuster 260 may be provided with an electromagnet provided by a coil. A plurality of magnetic force adjusters 260 may be spaced apart from each other in the circumferential direction about the center axis X and/or be provided at a center inside of the magnetic force generator 250. The magnetic force generator 250 and the magnetic force adjuster 260 may alternatively be referred to as a primary force or field generator and a secondary force or field generator, respectively.

As exemplified in FIGS. 6 and 7, there may be four magnetic force adjustors 260a, 260b, 260c, and 260d spaced apart from each other in the circumferential direction. However, embodiments disclosed herein are not limited to four magnetic force adjustors 260a through 260d (e.g., there may be three magnetic force adjustors spaced apart by 120 degrees). When a current is applied to one of the four magnetic force adjustor 260a, 260b, 260c, and/or 260c, a polarity may be created such that one of the upper or surfaces of the magnetic force adjustor (e.g., 260a) has a N pole, and the other of the upper and lower surfaces has an S pole. A selection of the particular magnetic force adjustor among the four magnetic force adjusters 260a-260d, along with a current supplied, may be based on a misalignment of the floating body 400 and may be configured to guide the floating body 400 back toward the central axis X.

For example, when the floating body 400 is initially in an equilibrium state but exhibits a fine movement that deviates from the central axis X in one direction, the hall sensor 270 may sense the magnetic flux change, and a current may be applied to the magnetic force adjustor 260a. An upper side of the magnetic force adjustor 260a may have an S pole to push the floating body 400 back onto the central axis X.

Alternatively or in addition thereto, there may be four additional magnetic force adjusters provided radially outside of the four magnetic force adjustors 260a, 260b, 260c, and 260d to further adjust a position of the floating body 400. The four inner magnetic force adjustors 260a-260d may be referred to as a first magnet force adjustor, while the outer additional magnetic force adjusters may be referred to as a second magnetic force adjustor. According to such an overlapping arrangement, it may possible to control a tilt of the floating body 400.

For example, a pair of facing magnetic force adjustors of the second magnetic force adjustor may be selected to counteract with or weaken certain inner magnetic force adjustors and to strengthen other magnetic force adjustors. In this case, the magnetic body 410 may be inclined by an offset or non-uniform magnetic force.

One of ordinary skill in the art should appreciate that the more magnetic force adjustors that are provided and the greater number of positions they are provided in, the greater the ability to customize a magnetic force and alter a position and orientation of the floating body 400. For example, twenty-four magnetic force adjustors may be provided radially. A pair of opposing magnetic force adjustors constituting the second or outer set of magnetic force adjustors may continuously move in a circumferential direction. In this case, an inclination direction of the floating body 400 may continuously change, and a direction of discharged air may be rotated.

An action of the magnetic force adjustors 260a-260d may be maintained, and a center position of the floating body 400 may be maintained by continuous sensing by the hall sensor 270 and adjustments by the magnetic force adjustor 260. A controller may be provided to control the magnetic force adjustors 260a-260d, the magnetic force generator 250, and the lifting device 280 and lifting mechanism 300. When the controller senses a certain signal sensed by the hall sensor 270, the controller may optionally control the optional second magnetic force adjuster to tilt the floating body 400.

A fan may be provided inside of the floating body 400 inside of the ribs 4311. When the floating body 400 is inclined or tiled and the fan inside of the floating body 400 is operated, the floating body 400 may be rotated. A direction in which the floating body 400 tilts or is inclined may be changed or rotated, and the fan housed in the floating body 400 may also be rotated so that the floating body 400 may blow clean air in various directions.

The lifting device 280 may be moved up and down by the lifting mechanism 300. The lifting mechanism 300 may be applied as various lifting mechanisms such as a rack and pinion mechanism by a motor, a worm mechanism, a linear actuator, a pneumatic or hydraulic mechanism operated by a plunger, etc. The lifting mechanism 300 may have gearing configured to lift and lower the lifting device 280.

As shown in FIG. 6, the lifting device 280 may be raised to a relatively low height h1, and accordingly, the floating body 400 may be spaced apart from an edge of the lower body 10 by a distance d1 in FIG. 4. As shown in FIG. 7, the lifting device 280 may be raised past h1 to a new height h2, and accordingly, the floating body 400 may be raised so as to be spaced apart by a distance d2 from the lower body 10 in FIG. 5.

A height of the lifting device 280 may correspond to a height of the floating body 300 so that the floating body 400. When the lifting device 280 is lowered down past h1, the floating body 400 may eventually be placed on the seating grill 106.

As previously described, the floating body 400 may house the magnetic body 410 that interacts with the magnetic force generator 250, the floating body WPT module 420 to receiving energy from the main body WPT module 117 of the body module 118, an operation portion 430, the floating body display 440, and also a battery to be charged by the WPT module 420.

The floating body display 440 may be visible to the user and may be positioned on the upper portion 23. The intermediate portion 22 may be provided with an operation portion 430, which may be another device operated in the floating body 400 such as a light. The lower portion 21 may be provided with the magnetic body 410 and the floating body WPT module 420, as the floating body WPT module 420 may have to align with the main body WPT module 117 to effectively receive power from and communicate with the main body 116.

Figure 8:
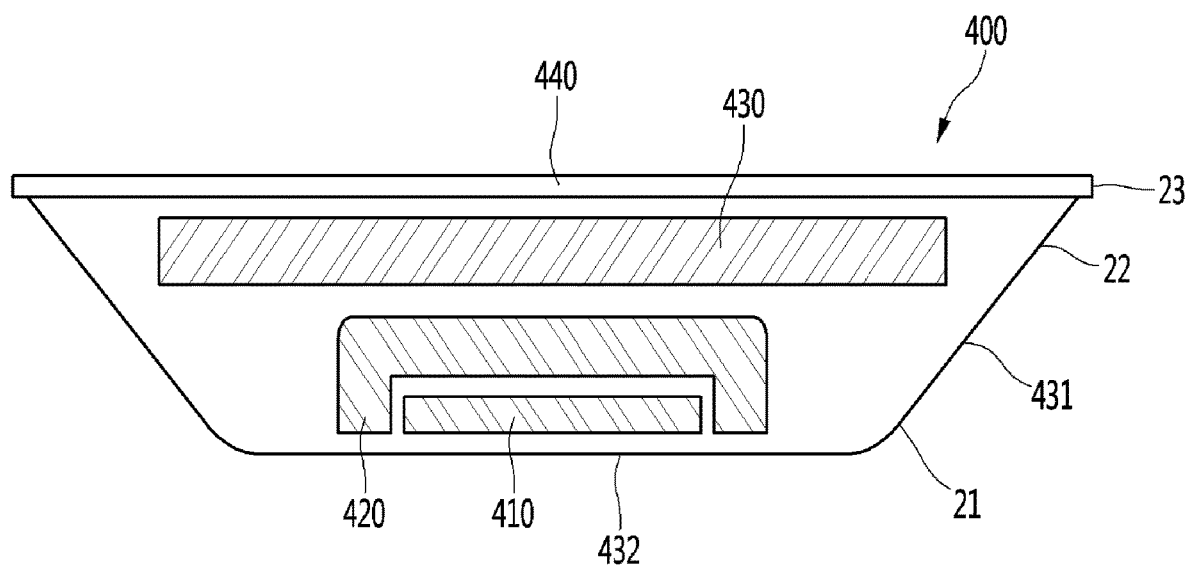
FIG. 8 is a view explaining an internal action of the float.

Referring to FIG. 8, the upper portion 23 of the floating body 400 may be wider than the lower portion 21. The magnetic body 410 provided at the lower portion 21 may be heavy, keeping a lower center of gravity and reducing a possibility that the floating body 400 may be overturned or displaced. The floating body display 440 may placed on the upper portion 23 at a side for easy visibility and convenience in inputting commands.

The operation portion 430 may be positioned at the intermediate portion 22. Various configurations may be employed as the above-mentioned operation portion 430. The operation portion 430 may include, for example, a light device emitting light of various colors depending on a sensed air quality, operation status, a command input by the user, or other information.

As another example, the operation portion 430 may be a fan. By rotating the fan, air discharged from the discharge guide device 190 may be blown farther. Since the floating body 400 may be rotated in a tilted state, a direction in which air is blown may be adjusted. The display 440 may be omitted to increase directions in which air may be blown. When the fan is rotated, the floating body 400 may be rotated by an action and a reaction action. However, since a weight of the fan and a weight of the floating body 400 may be different from each other, a number of revolutions of the floating body 400 may not match a number of revolutions of the fan per a given time period. A lower speed of rotation of the floating body 400 may more easily inform the user that the air purifier 1 is operating.

As another example, the operating portion 430 may be or include an air quality sensor. The air quality sensor may measure air quality of discharged clean air. A performance of the air purifier 1 may be visualized and displayed to the user via the floating body display 440 and/or the main body display 500, and the user may be alerted when it's time to replace the filter 120.

The floating body WPT module 420 may be placed below the operation portion 430. The floating body WPT module 420 may function as a wireless power transceiver or receiver and operate together with the main body WPT module 117 of the main body 116 (FIG. 2). The floating body WPT module 420 may receive power from the main body WPT module 117.

A wireless power transmission (WPT) may be a technique for wirelessly transmitting power. The wireless power transmission technology may include an electromagnetic inductive coupling method and/or a magnetic resonance method. A magnetic induction method may be a technique of transmitting and receiving power using electromagnetic induction phenomena between first and second coils. A frequency band of 100 to 205 Hz (WPC), 232 to 278 kHz, and 205 to 300 kHz (PMA) may be used for wireless power, and an in-band system may be used for communication.

A self-resonance method may be a technique of transmitting and receiving power by using a resonance phenomenon between two coils having a resonance frequency. A frequency band of the self-resonance method may use a band of 6.78 MHz±15 kHz (A4WP) for wireless power and uses BLE 2.4 GHz for an out-band method for communication.

The above two techniques have a distinction between transmission capacity and preference for each usage. Any method may be applied in the present disclosure.

The magnetic body 410 may be provided as a permanent magnet. An appearance of the floating body 400 may be provided by the rotating grill 431 and the bottom portion 432 provided on the bottom surface of the rotating grill 431. The bottom portion 432 and the rotating grill 431 may be in contact with an inner surface of the seating grill 106, reducing a possibility that the floating body 400 may be overturned due to an interaction with the lower body 10.

Figure 9:
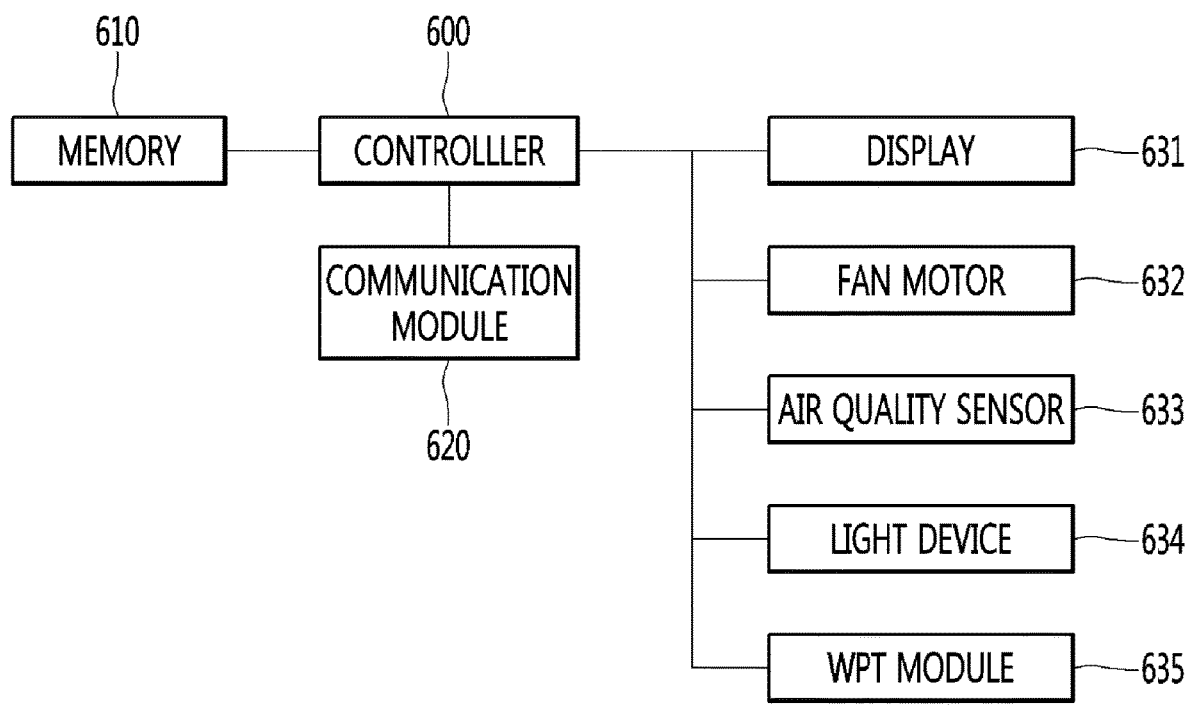
FIGS. 9 and 10 are block diagrams of the float and a main body, respectively.
Figure 10:
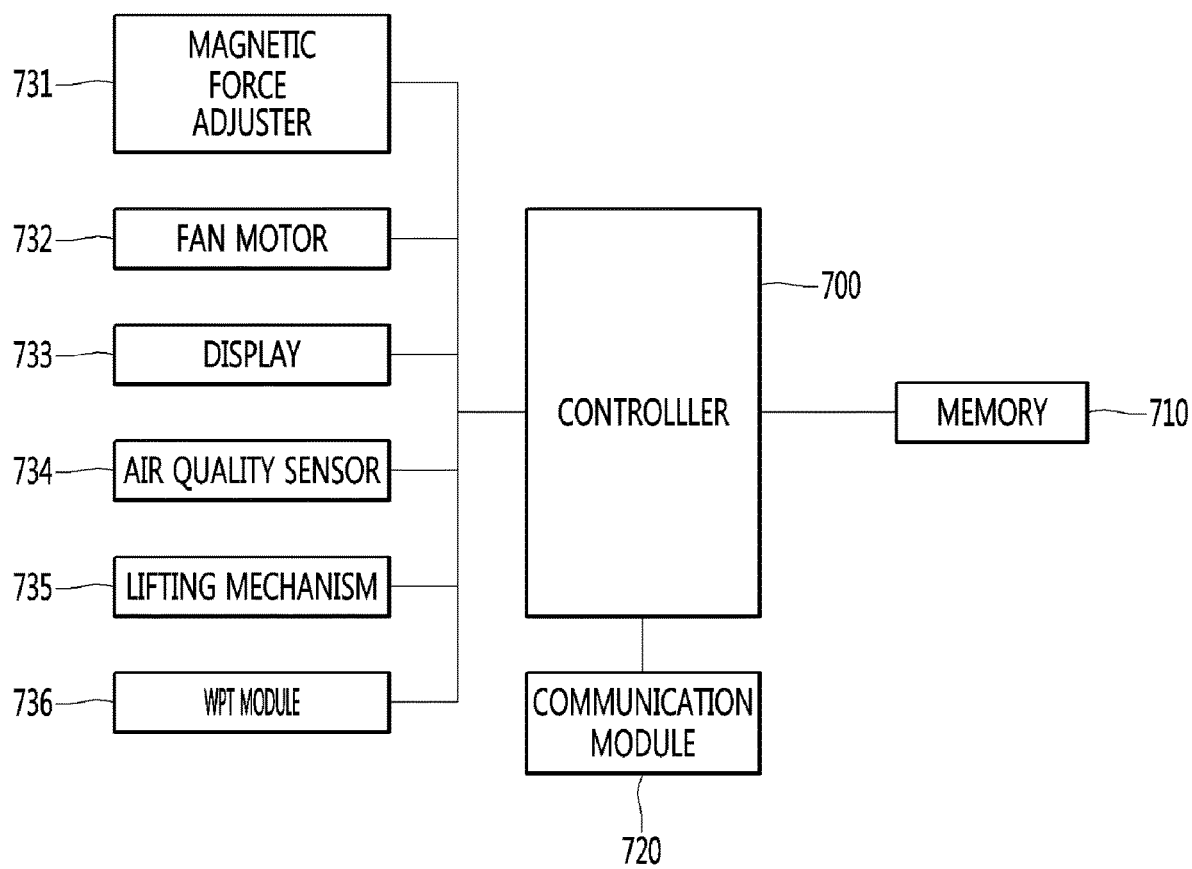

Referring to FIGS. 9 and 10, an interaction between the floating body 400 and the main body 116 will be described. In the following description, different reference numerals may be used for previously described elements. For example, the main body display previously designated reference numeral 500 nay not be designated reference numeral 733 in the below description. As another example, the lifting mechanism previously designated as 300 may not be designated 735 in the below description.

FIG. 9 may show primarily a control of the floating body 400, while FIG. 10 may primarily show a control of the main body 116. The floating body 400 and the main body 116 may include controllers 600 and 700, respectively, memories 610 and 710, respectively, and communication modules 620 and 720, respectively. Information may be stored in the memories 610 and 710 and communicated via the communication modules 620 and 720.

The floating body 400 may include a driving assembly having a display 631, a fan motor 632, an air quality sensor 633, and a light device 634. The main body 116 may include a driving assembly having a magnetic force adjuster 731, a fan motor 732, a display 733, a lifting mechanism 735, and an air quality sensor 734. Each of the floating body 400 and the main body 116 may have components of the other; that is, the driving assemblies may be combined and implemented in various combinations.

When the user operates in a normal mode where the floating body 400 is not levitated, the floating body 400 may serve primarily as a passage through which clean air passes. Each structure may be provided in a lattice structure rather than a planar structure, and the display 631 may be provided only on a rim so as not to interfere with air flow.

When the user wants to use the floating body 400, the floating body 400 may be lifted and levitated upward by using the lifting mechanism 735. After being lifted, the magnetic force adjuster 731 may maintain a horizontal state or alignment. After the use of the floating body 400 is completed, the lifting mechanism 735 may be operated in reverse to seat the floating body 400 on the seating grill 106.

When the user uses the floating body 400, the fan motor 632 may be operated. At this time, more air may be blown through and dispersed from the floating body 400. When the user desires to supply clean air in various directions while using the floating body 400, the magnetic force adjuster 731 may be adjusted to raise, lower, and/or tilt the floating body 400. The floating body 400 may be inclined and may be rotated in a tilted state. Clean air may be blown to a distant space in the room.

When the user wants to know air quality of the clean air during use of the floating body 400, the air quality sensor 633 may be operated. Information known or sensed by the air quality sensor 633 may be displayed on at least one of the display 631 of the floating body 400 or the display 733 of the main body 116.

In order to supply power to the floating body 400, the WPT module 736 of the main body and the WPT module 635 of the floating body may operate together. The WPT modules 736 and 635 may also perform functions of the communication modules 620 and 720.

This application is related to co-pending U.S. application Ser. Nos. 16/815,506 filed on Mar. 11, 2020, and 16/815,663 filed on Mar. 11, 2020, the entire contents of which are hereby incorporated by reference.

According to the present disclosure, a supply of clean air from the air purifier may be performed in various ways. There may an advantage that a flow path resistance may be reduced at the time of operation of the floating body, and space utilization of the air purifier may enhanced, satisfying a bigger variety of consumers.

Embodiments disclosed herein may provide an air purifier that may reduce a flow loss of air by narrowing a discharge space on a discharge side of the air purifier via a tilting mechanism, a rotating mechanism, and a fan necessary for operation of an air flow controller. Embodiments disclosed herein may provide a variety of directions of discharged air flow from which a user may select. Embodiments disclosed herein may efficiently utilize space occupied by the tilting mechanism and the rotating mechanism of the air flow controller, increasing convenience and efficiency.

Embodiments disclosed herein may be implemented as an air purifier including a main body having a fan, a filter, and a discharge port through which clean air may be discharged, and also a floating or levitating body maintained above the discharge port by a electromagnetic repelling force. The discharge port may not be clogged or obstructed, reducing a loss of air flow. A floating body or float may be lifted or levitated from the main body by a magnetic force so that an obstacle between the floating body and the main body may not be located.

A magnetic body may be placed on the floating body. A lower module may be provided in the main body to electromagnetically communicate or couple to the magnetic body so that magnetic force may be transmitted by two magnetic members which are separated from each other.

The lower module may include a lifting member that vertically moves up and down, a magnetic force or field generator provided in the elevating member and generating a magnetic force or field, and a magnetic force or field adjuster to adjust a magnetic force applied to the magnetic body. A posture and orientation of the floating body may be maintained.

A hall sensor may be provided in the lower module. The magnetic force, flux, and/or a magnitude of the magnetic field may be measured by the Hall sensor, and a center of the floating body may be maintained by controlling the magnetic force adjuster. An altitude or orientation of the floating body may be changed by an almost instantaneous external force so as to be maintained in a balanced state.

The magnetic force adjuster may adjust an inclination of the floating body. An air flow speed and direction of the floating body may be adjusted, and clean air may be discharged from the air purifier to be blown in various ways.

The magnetic force adjuster may further include a first magnetic force adjuster for holding a center position of the floating body and a second magnetic force adjuster to perform at least one of an adjustment of the inclination angle of the floating body and an inclination direction of the floating body. The posture or orientation, inclination angle, and inclination direction of the floating body may be adjusted together, and the user may use the floating body for various clean air blowing applications.

Each of the floating body and the main body may be provided with a wireless power transfer (WPT) module to exchange power, and the floating body may be supplied with electric power from the main body by WPT or radio. According to this, energy supply from the main body to the floating body may be conveniently performed. By the WPT module, the floating body and the main body may communicate with each other, and a control operation may be performed between the floating body and the main body.

The main body may extend the vertical direction. The discharge port may be provided at an upper end of the main body, and an upper surface of the discharge port may be provided with a downwardly recessed seating grill in which the floating body may be seated. An outer side of the seating grill may have a predetermined inclination or curvature to accommodate the floating body when seated and to keep the floating body centered when levitated and when seated. Clean air may be blown from a high indoor space or region so that clean air may be supplied and dispersed to a wider indoor space.

The seating grill may be provided with a linear or flat member in a lattice shape so that clean air may pass therethrough and to reduce a resistance or obstruction in the discharge port. The lattice shape may be a grid shape or a diamond grid shape. A body module may be provided below the seating grill and interact with the floating body so that an interaction between the floating body and the body module may be smoothly performed.

The body module may include a lower module corresponding to a magnetic body placed on the floating body and a WPT module corresponding to a WPT module in the floating body. Components requiring connection between the main body and the floating body may be provided in a single body module so that mutual remote operation may be smoothly performed.

The floating body may be provided with a fan so that clean air may be blown farther into the indoor space. An air quality sensor may be provided on the floating body to inform the user of the quality of the discharged air. The floating body may be provided with a lamp to improve visibility and illumination. The floating body may be provided with a display so that an operating state of the floating body and the main body may be easily recognized. The display may be provided with a touch panel so that the user may operate the floating body and the main body.

Embodiments disclosed herein may be implemented as an air purifier comprising a main body to discharge clean air to a discharge port and a floating or levitating body magnetically levitated from the main body by a magnetic force. A discharge port of the main body may be completely opened during operation of the main body, and a flow path resistance may be reduced. An opening of the discharge port may be enlarged because there may be no connection structure between the main body and the floating body obstructing a flow of air. The main body may discharge air through the discharge port, and the floating body may be spaced apart from the discharge port and diffuse the discharged air so that clean air may be supplied a farther distance into the interior space or room.

Since an interval between the floating body and the main body may be large, obstruction in an air flow path may be reduced or eliminated, increasing a discharge efficiency of the clean air. Since the user may select whether to use the floating body, the user's choice may be enhanced as various operating modes of the air purifier may be implemented, and the user may operate the air purifier in a desired state. The user may more conveniently use the air purifier by mounting various devices in a space between the floating body and the main body and a widened space inside the floating body. Since time information and other data may be transmitted through the floating body of the air purifier to be observed by a user, the air purifier may be conveniently used.

Embodiments disclosed herein may be implemented as an air purifier comprising a main body having a fan to suction air, a filter to filter suctioned air, a discharge port through which filtered air may be discharged, and a primary field generator to cause an electromagnetic force, and a float provided above the discharge port and having a magnetic body that interacts with the primary field generator of the main body to levitate above the discharge port in a first direction when the primary field generator generates a magnetic field.

The main body may include a lower body having a case, the primary field generator being configured to move in the first direction in the case, a lifting device configured to selectively move the primary field generator in the first direction, and a secondary field generator configured to further adjust the electromagnetic force applied to the magnetic body of the float.

A Hall may be sensor provided in the lower body to sense magnetic information including at least one of a magnetic flux or a magnetic force magnitude. The secondary field generator may be controlled based on the sensed magnetic information to maintain a position of the float centered above the main body.

The secondary field generator may be configured to provide an electromagnetic force to tilt the float to a predetermined inclination angle and a predetermined inclination direction.

The secondary field generator may include a plurality of inner electromagnets arranged along a circumferential direction, and a plurality of outer electromagnets arranged in the circumferential direction and arranged to be radially outside of the inner electromagnets. The outer electromagnets may be configured to adjust an inclination of the float.

The float may include a wireless power transfer (WPT) receiver. The main body may include a WPT transmitter configured to wirelessly transmit power to the WPT receiver.

The discharge port may be provided at an upper end of the main body. An upper surface of the discharge port may be recessed downward to form a seating grill that may be configured to receive the float.

The seating grill may include a center portion and an outer side. The outer side of the seating grill may have a predetermined angle of inclination relative to the center portion that may be configured to keep the float centered.

The primary field generator may be provided under the seating grill. The primary field generator may be provided in a lower body. The lower body may include a wireless power transfer module configured to transfer power to a wireless power transfer module provided in a lower surface of the float.

The float may include a fan. A side surface of the float may be formed of ribs that are bent such that, when air may be discharged from the discharge port, the float may be rotated based on air flow between adjacent ribs. The float may include an air quality sensor. The float may include a light device to indicate at least one of a detected air quality, an operation status, or a command input by a user. The float may include a display to indicate at least one of an operating status of the float or an operating status of the main body. The display may be provided with a touch panel configured to receive commands input by a user.

Embodiments disclosed herein may be implemented as an air purifier comprising a main body having a fan, a discharge port through which air may be discharged, and a field generator to cause an electromagnetic force and/or to generate an electromagnetic field, and a float provided above the discharge port and having a magnetic body that interacts with the field generator to levitate above the main body when the field generator generates the electromagnetic field. The float may include a plurality of angled ribs and a plurality of slits. The ribs may cause the float to rotate when air may be discharged through the slits. A fan may be provided in the float to suction and discharge air through the float. The float may serve to change a direction of air discharged from the discharge port of the main body.

Embodiments disclosed herein may be implemented as an air purifier comprising a main body having a suction port, a fan to suction air through the suction port, a filter to filter suctioned air, a discharge port through which filtered air may be discharged, and a field generator configured to be moveable in a first direction, and a float having a magnetic body that interacts with the field generator to levitate above the main body when the field generator generates a magnetic field. The float may be configured to move in the first direction based on a movement of the field generator in the first direction.

The main body may include a lower body having a case. The field generator may be configured to move in the first direction within the case. A lifting mechanism having a motor may selectively move the field generator in the first direction.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An air purifier, comprising:
    a main body having a fan to suction air, a filter to filter suctioned air, a discharge port through which filtered air is discharged, and a primary field generator to cause an electromagnetic force; and
    a float provided above the discharge port and having a magnetic body that interacts with the primary field generator of the main body to levitate above the discharge port in a first direction when the primary field generator generates a magnetic field,
    wherein the main body includes:
        a lower body having a case, the primary field generator being configured to move in the first direction in the case; and
        a lifting device configured to selectively move the primary field generator in the first direction.

2. The air purifier of claim 1, wherein the main body includes:
    a secondary field generator configured to further adjust the electromagnetic force applied to the magnetic body of the float.

3. The air purifier of claim 2, further comprising a Hall sensor provided in the lower body to sense magnetic information including at least one of a magnetic flux or a magnetic force magnitude, wherein the secondary field generator is controlled based on the sensed magnetic information to maintain a position of the float centered above the main body.

4. The air purifier of claim 2, wherein the secondary field generator is configured to provide an electromagnetic force to tilt the float to a predetermined inclination angle and a predetermined inclination direction.

5. The air purifier of claim 2, wherein the secondary field generator includes:
    a plurality of inner electromagnets arranged along a circumferential direction; and
    a plurality of outer electromagnets arranged in the circumferential direction and arranged to be radially outside of the inner electromagnets, the outer electromagnets being configured to adjust an inclination of the float.

6. The air purifier of claim 1, wherein the float includes a wireless power transfer (WPT) receiver, and the main body includes a WPT transmitter configured to wireles sly transmit power to the WPT receiver.

7. The air purifier of claim 1, wherein the discharge port is provided at an upper end of the main body, and an upper surface of the discharge port is recessed downward to form a seating grill that is configured to receive the float.

8. The air purifier of claim 7, wherein the seating grill includes a center portion and an outer side, and the outer side of the seating grill has a predetermined angle of inclination relative to the center portion that is configured to keep the float centered.

9. The air purifier of claim 1, wherein the primary field generator is provided under the seating grill.

10. The air purifier of claim 9, wherein the primary field generator is provided in a lower body, and the lower body includes a wireless power transfer module configured to transfer power to a wireless power transfer module provided in a lower surface of the float.

11. The air purifier of claim 1, wherein the float includes a fan.

12. The air purifier of claim 1, wherein a side surface of the float is formed of ribs that are bent such that, when air is discharged from the discharge port, the float is rotated based on air flow between adjacent ribs.

13. The air purifier of claim 1, wherein the float includes an air quality sensor.

14. The air purifier of claim 1, wherein the float includes a light device to indicate at least one of a detected air quality, an operation status, or a command input by a user.

15. The air purifier of claim 1, wherein the float includes a display to indicate at least one of an operating status of the float or an operating status of the main body.

16. The air purifier of claim 15, wherein the display is provided with a touch panel configured to receive commands input by a user.

17. An air purifier, comprising:
    a main body having a fan, a discharge port through which air is discharged, and a field generator to generate an electromagnetic field;
    a float provided above the discharge port and having a magnetic body that interacts with the field generator to levitate above the main body in a first direction when the field generator generates the electromagnetic field, the float including a plurality of angled ribs and a plurality of slits, the ribs causing the float to rotate when air is discharged through the slits; and
    a lifting device configured to move the field generator within the main body in the first direction and relative to the discharge port.

18. The air purifier of claim 17, further comprising a fan provided in the float to suction and discharge air through the float.

19. An air purifier, comprising:
- a main body having a suction port, a fan to suction air through the suction port, a filter to filter suctioned air, a discharge port through which filtered air is discharged, and a field generator configured to be moveable in a first direction; and
- a float having a magnetic body that interacts with the field generator to levitate above the main body when the field generator generates a magnetic field, the float being configured to move in the first direction based on a movement of the field generator in the first direction.

20. The air purifier of claim 19, wherein the main body includes:
- a lower body having a case, the field generator being configured to move in the first direction within the case; and
- a lifting mechanism having a motor to selectively move the field generator in the first direction.

\* \* \* \* \*